Patented Feb. 20, 1945

2,370,015

UNITED STATES PATENT OFFICE 2,370,015

DERIVATIVES OF TERTIARY AMINO ALIPHATIC ACIDS

Otto Dalmer, Claus Diehl, and Hartmann Pieper, Darmstadt, Germany, assignors to Merck & Co. Inc., Rahway, N. J., a corporation of New Jersey No Drawing. Continuation of application Serial No. 49,822, November 14, 1935. This application January 8, 1941, Serial No. 373,602. In Germany July 24, 1933

4 Claims. (Cl. 260—471)

This invention relates to derivatives of tertiary amino aliphatic acids, and to processes for their production.

Derivatives of tertiary amino aliphatic acids, especially esters of alcohols poorly soluble in water, such as benzyl alcohol or trichloro-tertiary-butyl-alcohol, for example, have previously been produced by first preparing the halo-acyl derivatives of the required alcohols, etc., and then reacting upon them with secondary amines; (cf. in Ber. der Deutschen Chem. Ges., vol. 48 (1915) pp. 2038 and 2041; DRP 289, 426, and DRP 537, 450). The amino-acid derivatives thus obtained have found useful application as medicines in the form of their easily water-soluble salts.

Other processes for the preparation of such products, especially the conversion of the amino acids into their halides and the treatment of such acid halides with the respective alcohols, etc., appeared to be technically impracticable because according to the known work of Emil Fischer (Ber. der Deutsch. Chem. Ges., vol. 38, 1905, pp. 605 and 2914, and vol. 39, 1906, p. 544), the aliphatic amino-acid halides can only be produced by a troublesome process, and as readily decomposable substances difficult to work with.

We have now found, however, that the hitherto unknown halides of tertiary amino-aliphatic acids, can be produced, without difficulty, by the methods of producing acid halides generally, that is, by heating the said acids with reagents which will halogenate the carboxyl group, such as thionyl chloride, phosphorus halides, etc.

While the other amino acids, when so treated, become discolored and completely decompose, the pure tertiary acids, when treated according to our process, remain practically colorless, and, by brisk reaction, the amino-acid halides are produced in the form of their salts of the hydrogen halide acids which generally remain in crystalline form after the excess of halogenating agent is distilled off.

Our work has included experiments with a large number of variously substituted amino aliphatic acids, including acids having aromatic substituents, with similar favorable results.

The tertiary amino acid halides thus obtained are generally strikingly stable and well characterized substances. It is interesting to note, for example, that β-N(dimethyl)amino-α-diethyl-propionyl chloride-hydrochloride will dissolve in cold water without decomposition to a clear solution, from which the free amino-acid-chloride can even be extracted as an oil with the aid of a concentrated potassium-carbonate solution.

Furthermore, these amino acid halides are capable of various reactions and may be used in many conversion processes. For instance, with alcohols and phenols they form the respective amino acid esters; with amines they form the respective amides. Surprisingly, they are even capable of being reacted with suitable benzol derivatives in the manner of the Friedel-Crafts reaction, to thus form the respective aromatic amino ketones. Excellent yields are obtained with this reaction.

The substances prepared in this manner are used as medicinal preparations, or as intermediates in the production of medicinal preparations. They are particularly suitable for such use, because the presence of the amino-acid group generally indicates a high degree of water-solubility. More especially, very valuable pharmacological properties are exhibited by the esters formed by the reaction of β-N(di-substituted)amino-α-dialkyl-propionic acids with fatty aromatic alcohols.

Furthermore, since, by the disclosures of DRP Nos. 597,305 and 600,541, more complicated primary amino acids have become readily available substances which can be easily converted into tertiary amino acids, by alkylation, the direct introduction of the easily prepared amino acid radicals into the various substances by the instant process represents an important technical improvement over the step-by-step introduction, first of halogen-acyl radicals, and then of amines, by the method of the prior art. Furthermore, in the older known process there is always danger that the ester group will be converted into the amide group by the excess of amine used in the process of reacting amines upon halogen-carbonic-acid-esters. (See Ber. der Deutschen Chemischen Ges., vol. 35, 1902, p. 594.) Such disadvantages are overcome by the present process.

Example 1

14.3 grams piperidino-acetic acid are added in drops to 50 cc. of thionyl chloride and the mixture is boiled for 20 minutes with refluxing; the acid goes into solution with liberation of sulphurdioxide and hydrogen chloride. The excess of thionyl chloride is distilled off, and the residue washed with gently boiling petroleum ether. The piperidino-acetyl-chloride-hydrochloride thus obtained is in the form of almost colorless needles several millimeters long.

By pouring over 25 cc. benzyl alcohol, the amino-acid chloride-hydrochloride is dissolved under spontaneous heating, whereby hydrogen chloride escapes by effervescence. After cooling, water is added and briefly extracted with ether, and the aqueous solution is treated with a concentrated potassium carbonate solution. The piperidino-acetic acid benzyl ester separates as an oil, which is extracted with ether. After drying and distilling off the ether, the boiling point of the esters is 171–172° in vacuo at 11 mm. The hydrochloride is precipitated by conducting hydrogen chloride into the ethereal solution of the ester. After recrystallization from alcohol, it forms colorless leaves, having a melting point of 141°, easily soluble in water, with almost neutral reaction.

*Example 2*

The ethyl ester of dimethyl-cyano-acetic acid is hydrogenated to the ethyl ester of β-N(dimethyl)amino-propionic acid, according to Example 3 of German Patent Nr. 597,305. It boils in vacuo at 65–67°, 12 mm. The hydrochloride of the ester forms leaves having a melting point of 101°.

1 mol of the dry ester-hydrochloride is evenly mixed with 100 g. paraformaldehyde (10%) excess over the calculated quantity) and heated with refluxing in the oil bath in a large flask. At a bath temperature of 120–130° the powder liquefies with effervescence and the liberation of large quantities of water and carbon dioxide. The latter escapes in streams through the reflux without material loss of formaldehyde. The main reaction is completed in about half an hour; the substance is heated for a short while longer at 140–150° in order to complete the reaction. The aqueous solution of the hydrochloride of the ethyl ester of β-N(dimethyl)amino-α-dimethyl-propionic acid obtained is completely free of primary, secondary or quaternary amino compounds. The free amino-ester forms an oil which boils sharply at 66–67° in vacuo at 12 mm. The free β-N(dimethyl)amino-α-dimethyl-propionic acid crystallizes in needles having a melting point of 100° from alcohol on addition of ether.

400 cc. thionyl chloride are added in drops to 145 grams β-N(dimethyl)amino-α-dimethyl-propionic acid. Under brisk liberation of sulphur-dioxide and hydrogen chloride, the substance remains colorless and goes into solution. During boiling, the hydrochloride of the β-N(dimethyl)-amino-α-dimethyl-propionic-acid-chloride crystallizes out. After one hour's boiling with refluxing the excess thionyl chloride is distilled off and the colorless crystalline residue is washed with boiling petroleum ether. The amino-acid-chloride-hydrochloride forms white glossy leaves melting at 180° with evolution of gas.

An excess of benzyl alcohol is poured over the amino-acid-chloride-hydrochloride and heated for ½ hour on the steam bath. After cooling, the product is dissolved in water, extracted with ether, then treated with potassium-carbonate solution and the oil obtained is dissolved in ether. After drying and distilling off the ether, the benzyl ester of β-N(dimethyl)amino-α-dimethyl-propionic acid boils at 142° (11 mm.). It forms a colorless, smelling weakly basic oil. By conducting hydrogen chloride gas into the ethereal solution, the hydrochloride is precipitated; after recrystallization it forms colorless needles, having a melting point of 120° and which are very easily soluble in water with neutral reaction.

*Example 3*

20 grams of the hydrochloride of β-N(dimethyl)amino-α-dimethyl-propionic-acid-chloride (see Example 2) are mixed with 22 grams trichloro-tertiary-butyl alcohol and heated for about 2 hours at 160–170°. After cooling, the product is dissolved in water, extracted with ether, the aqueous solution treated with potassium-carbonate solution, and the oily trichloro-tertiary butyl ester of β-N(dimethyl)amino-α-dimethyl-propionic-acid extracted with ether. After drying and distilling off the ether, the amino ester is distilled in vacuo at 133° (12 mm.). The hydrochloride is precipitated from the ethereal solution with hydrogen chloride and recrystallized from acetone in the form of fine leaves having a melting point of 171° and being easily soluble in water.

*Example 4*

20 grams of the hydrochloride of β-N(dimethyl)amino-α-dimethyl-propionic-acid-chloride are heated 1½ hours to 160° in an oil bath with 20 grams thymol. The transparent syrup obtained is dissolved in water and ether and extracted with ether; from the aqueous solution the thymol ester of β-N(dimethyl)amino-α-dimethyl-propionic acid is precipitated with potassium carbonate solution and extracted with ether. After drying the ethereal solution, the ester-hydrochloride is precipitated by the addition of hydrogen chloride. After recrystallization from acetone it melts at 115°; it forms colorless crystals, easily soluble in water.

*Example 5*

20 grams of the hydrochloride of β-N(dimethyl)amino-α-dimethyl-propionic-acid-chloride are mixed with 25 grams urethane and heated to about 130° in the oil bath. Under effervescence, hydrogen chloride escapes. After about half an hour, the reaction is completed. The product is dissolved in water, freed from some allophanic-acid-ester by filtration, the filtrate mixed with potassium carbonate solution and the separated oil extracted with ether. The ether is dried with potassium carbonate and the hydrochloride of β-N(dimethyl)amino-α-dimethyl-propionyl-urethane precipitated by addition of hydrogen chloride. After recrystallization from alcohol, it melts at 169°.

*Example 6*

Over 20 grams of the hydrochloride of β-N(dimethyl)amino-α-dimethyl-propionic-acid-chloride are poured 200 cc. benzol and 27 grams aluminum chloride are added. The amino-acid-chloride liquefies with slight evolution of heat, whereby hydrogen chloride escapes. After boiling for 2 hours with refluxing the product which is still almost colorless, forms two layers. It is poured on ice and the benzol distilled off with steam. The residue is treated with a small quantity of carbon in order to remove slight quantities of resins, filtered, treated with excessive sodium hydrochloride and extracted with ether. After drying the ethereal solution with potassium carbonate, the hydrochloride of β-N(dimethyl)amino-α-dimethyl-propiophenone is precipitated with ethereal hydrochloric acid. Recrystallized from alcohol, it forms colorless needles melting at 144° and being easily soluble in water.

*Example 7*

The ethyl ester of β-amino-α-diethyl-propionic acid obtained from diethylcyano-acetic ester, prepared according to Example 3 of DRP 597,305, is dimethylated on the nitrogen, according to the process described in Example 2 (Bp 12=94°) and saponified to the acid which crystallizes from alcohol in colorless needles, easily soluble in water and melting at 88°.

50 cc. benzol are poured over 26 grams β-N(dimethyl)amino-α-diethyl-propionic acid and 13.7 grams phosphortrichloride are added in drops and the mixture boiled for one hour with refluxing. The benzol is poured off from the lower oil layer and the rest of the benzol is distilled off in vacuo. The residue is heated with about 25 cc. benzyl alcohol for one hour to 140–150°. The rest of the procedure is the same as in Example 2. The benzyl ester of β-N(dimethyl)amino-α-diethylpropionic-acid which is formed boils at 153–154° (5 mm.).

*Example 8*

To 17.3 grams β-N(dimethyl)amino-α-diethyl-propionic acid are added 15 grams phosphorous-oxy-chloride, in drops, and the mixture is heated for 1 hour in the water bath with refluxing. The excessive phosphorous-oxy-chloride is removed by extraction with petroleum ether. 50 cc. benzol are poured over the residue and the whole treated with 11 grams benzyl alcohol. By adding 16 grams pyridine, in drops, the conversion of the amino-acid-chloride with the benzyl alcohol takes place at room temperature. The rest of the procedure is the same as in Example 2. The ester obtained is identical with that obtained in Example 7.

*Example 9*

17.3 grams β-N(dimethyl)amino-α-diethyl-propionic-acid are treated with 14 grams phosphorous-pentachloride. A violent reaction takes place automatically and completed after a short heating on the water bath. The mixture of phosphorous and hydrochloric-amino-acid-chlorides obtained is purified in a manner analogous to Example 8 by extraction with petroleum ether, and treated with benzyl alcohol. The amino-acid-ester obtained is identical with the esters obtained according to Examples 7 and 8.

*Example 10*

17 grams diethylamino-acetic-acid-hydrochloride are heated with 20 cc. thionyl chloride, whereby the amino-acid dissolves under vehement reaction. After 1 hour, ether is added and the hydrochloride of diethylamino-acetyl-chloride is filtered by suction in the form of white crystalline powder. Under slight heating with 20 cc. benzyl alcohol on the water bath, the conversion takes place in a few minutes. The benzyl ester of diethylamino-acetic acid, obtained in the usual manner, boils between 149–150° at 12 mm. pressure as almost colorless oil in accordance with the disclosures of DRP 537,450. Its crystalline hydrochloride melts at 89°.

*Example 11*

22 grams β-N(dimethyl)amino-α-ethyl-α-isoamyl-propionic-acid having a melting point of 55° (obtained in a manner analogous to the β-N(dimethyl)amino-α-diethyl-propionic-acid mentioned in Example 7) are chlorinated by heating for half an hour with 25 cc. thionyl chloride. By adding petroleum ether, the hydrochloride of the amino-acid-chloride is separated in crystalline form. After pouring over 30 cc. benzyl alcohol and heating for a short time on the steam bath a brisk reaction takes place, which is completed in about a quarter of an hour. By shaking the reaction product with petroleum ether and a small quantity of the hydrochloride of the benzyl ester of β-N(dimethyl)amino-α-ethyl-α-isoamyl-propionic-acid is separated as a crystalline pulp which can easily be filtered off by suction. After recrystallization from acetone the hydrochloride forms easily soluble, lustrous leaves having a melting point of 82–83°.

*Example 12*

150 cc. benzol are poured over 40 grams of the hydrochloride of β-N(dimethyl)amino-α-diethyl-propionic-acid-chloride (see Example 7), and 40 grams salicylic-acid-benzyl-ester are added; 27 grams pyridine are added, in drops, at a temperature of about 50–60° with stirring. The reaction takes place quickly and is completed by heating to almost boiling O-[β-N(dimethyl)-amino-α-diethyl-propionyl]-salicylic-acid-benzyl-ester is obtained by the usual process and distills at 242°, 5 mm. pressure, in the form of a thick oil. Its hydrochloride forms solid crystals melting at 130–131°.

The free O-[β-N(dimethyl)amino-α-diethyl-propionyl]-salicylic-acid which may be obtained from the ester, forms colorless crystals, easily soluble in water with neutral reaction, and having a melting point of 103°.

*Example 13*

The hydrochloride of β-N(dimethyl)amino-α-diethyl-propionic-acid-chloride is boiled for 1 hour in benzol with a little less than 1 mol of 3-oxy-4-methoxy-phthalide-(1,2) with strong evolution of hydrogen chloride, and finally the product crystallizes out.

3[β-N(dimethyl)amino-α-diethyl-propionyl-oxy-] 4 methoxy-phthalide (1,2) is obtained by the usual process and melts at 105–106°. Its hydrochloride forms thick white glossy prisms which melt under decomposition at 213–214°.

*Example 14*

According to the methylation process described in Example 2, the ethyl ester of β-amino-α-ethyl-α-phenyl-propionic-acid, prepared according to Example 1 of DRP 600,541, is methylated on the nitrogen and saponified to crystalline β-N(dimethyl)amino-α-ethyl-α-phenyl-propionic-acid, melting at 128–129°. (The melting point of its hydrochloride is 218–220°.)

From this the well crystallized chloride-hydrochloride is obtained with thionyl-chloride, f. i. in chloroform. With benzyl alcohol, in the same manner as described several times in other examples, the benzyl ester of β-N(dimethyl)amino-α-ethyl-α-phenyl-propionic-acid is obtained which distills between 192–193° at ⅘ mm. Hg-pressure, easily soluble in all organic solvents; its hydrochloride has a melting point of 168–168.5°, easily soluble in water, hot acetone, methyl- and ethyl-alcohol.

*Example 15*

In a manner similar to that described in Example 14, β-N(dimethyl)amino-α-methyl-α-phenyl-propionic-acid is obtained from methyl-phenyl-cyanic-acetic ester as a snowwhite, crystalline product, melting at 150°.

It also gives a well crystallized chloride-hydrochloride which is suitable for all conversions.

Thus, with benzyl alcohol it forms β-N(dimethyl)amino-α-methyl-α-phenyl-propionic-acid-benzyl ester (B$_p$ 10 194–195°). Hydrochloride (from acetone) spears melting at 148–149°.

*Example 16*

By treating the hydrochloride of β-N(dimethyl)amino-α-diethyl-propionic-acid-chloride in benzol in the presence of pyridine with p-phenetidine, the β-N(dimethyl)amino - α - diethyl - propionic-acid-p-phenetidine is obtained in excellent yields; its hydrochloride forms needles melting at 192°.

*Example 17*

Ammonia gas is conducted into the dispersion of the hydrochloride of β-N(dimethyl)amino-α-ethyl-α-isoamyl-propionic-acid-chloride in benzol to the point of saturation and until the incipient heat evolution has abated. The reaction mixture is washed with water, the benzol solution is dried and drawn off. The residue is dissolved in ether; β-N(dimethyl)amino-α-ethyl-α-isoamyl-propion-amide-hydrochloride is obtained from the clear solution with ethereal hydrochloric acid, in the form of leaves melting at 160-161°.

By treating the said amino-acid-chloride-hydrochloride with methylamine, the β-N(dimethyl)amino-α-ethyl-α-iso-amyl-propion-methyl-amide is obtained (Bp 5 135-137°); its hydrochloride melts at 137°.

*Example 18*

By treating the hydrochloride of β - N(dimethyl)amino-α-diethyl-propionic-acid- chloride with γ-N(dimethyl)amino-β-diethyl-propyl alcohol in the presence of pyridine in the manner heretofore described, [β-N(dimethyl)amino-α-diethyl-propionyl]-[(γ-N(dimethyl)amino - β' - diethyl)-propyl-]-ester is obtained (Bp 7 173-174°) which forms a well crystallized dihydrochloride, melting at 198°.

*Example 19*

By treating the hydrochloride of β - N(dimethyl)amino-α-diethyl-propionic-acid -chloride with salicylic-acid-β'-phenyl-ethyl-ester in the presence of pyridine in the manner heretofore described, O-[β-dimethylamino - α - diethyl - propionyl]-salicylic-acid-β'-phenyl-ethyl-ester is obtained which forms a well crystallized hydrochloride, melting at 118°, of which about 0.7% dissolve in water of 18°, and being recrystallizable from acetone-ether, forming with nitric acid a nitrate which is almost insoluble in water.

The following substances may be obtained by the same method as described in the above examples:

O-[β - N(dimethyl)amino-α-diethylpropionyl]-salicylic - acid - butyl - ester. Bp 5 207°. Hydrochloride rhombic glass-clear leaves Mp 55°.

O-[β - N(dimethyl)amino-α-diethylpropionyl]-mandelic-acid-methyl-ester. Bp 5 186-188°. Hydrobromide cubic plates Mp 130°.

β-N(dimethyl)amino - α - diethylpropionyl-[2-methoxy-,4-allyl-phenyl-]-ester. Hydrochloride Mp 179°.

O-[β-N(dimethyl)amino- α -diethylpropionyl-] tropa acid-ethyl-ester. Hydrochloride oily.

B-N(dimethyl)amino - diethylpropionic - acid-[α'β'diphenyl-ethyl]-ester. Hydrochloride rhombic crystals Mp 198-199°.

O-[β-N(dimethyl)amino-α-diethylpropionyl-]-p-cresotinic acid-phenyl-ethyl-ester. Hydrochloride Mp 147°.

β - N(dimethyl)amino-α-ethyl-α-phenylpropionic-acid-β'phenyl-ethyl-ester. Bp 5 200-201°. Hydrochloride Mp 157-158°.

O-[β - N(dimethyl)amino-α-ethyl - α - phenyl-propionyl-] salicylic-acid-β'phenyl-ethyl-ester. Hydrochloride Mp 135-136°.

β - N(dimethyl)amino-α-ethyl-α-phenylpropionic-acid-[2-phenyl-butyl]-ester. Bp 5 206-207°. Hydrochloride Mp 115°.

Di[β - N(dimethyl)amino-α-methyl-α-phenyl-propionyl]-hydrazine. White needles Mp 154-155°.

The above examples have been given by way of illustrating our invention and we should not be limited thereto except insofar as is necessitated by the prior art and the spirit of the appended claims.

This application is a continuation of our application Serial No. 49,822, filed November 14, 1935.

We claim:

1. Compounds of the formula

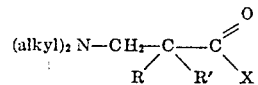

wherein R is alkyl, R' is selected from the group consisting of alkyl and aryl radicals, and X is selected from the group consisting of aryloxy and aralkoxy radicals, and hydrohalides thereof.

2. β - N(dimethyl)amino- α -ethyl- α -isoamyl-propionic-acid-benzyl-ester.

3. O-[β - N(dimethyl)amino- α -diethyl-propionyl]-salicylic-acid-benzyl-ester.

4. β-N(dimethyl)amino-α-ethyl-α-phenyl-propionic-acid-benzyl-ester.

OTTO DALMER.
CLAUS DIEHL.
HARTMANN PIEPER.